United States Patent
Mori

(10) Patent No.: US 11,193,589 B2
(45) Date of Patent: Dec. 7, 2021

(54) SEALING DEVICE

(71) Applicant: NOK CORPORATION, Tokyo (JP)

(72) Inventor: Tatsuya Mori, Fukushima (JP)

(73) Assignee: NOK CORPORATION, Tokyo (JP)

( * ) Notice: Subject to any disclaimer, the term of this patent is extended or adjusted under 35 U.S.C. 154(b) by 158 days.

(21) Appl. No.: 16/488,209

(22) PCT Filed: Mar. 26, 2018

(86) PCT No.: PCT/JP2018/012199
§ 371 (c)(1),
(2) Date: Aug. 22, 2019

(87) PCT Pub. No.: WO2018/181210
PCT Pub. Date: Oct. 4, 2018

(65) Prior Publication Data
US 2020/0325989 A1  Oct. 15, 2020

(30) Foreign Application Priority Data

Mar. 29, 2017 (JP) .............................. JP2017-064477

(51) Int. Cl.
*F16J 15/18* (2006.01)
*F16J 15/3232* (2016.01)
*F16J 15/324* (2016.01)

(52) U.S. Cl.
CPC ............ *F16J 15/18* (2013.01); *F16J 15/324* (2013.01); *F16J 15/3232* (2013.01)

(58) Field of Classification Search
CPC .... F16J 15/00; F16J 15/16; F16J 15/50; F16J 15/52; F16J 15/18; F16J 15/181;
(Continued)

(56) References Cited

U.S. PATENT DOCUMENTS 4,300,778 A * 11/1981 Gagne .................... F16J 15/166
277/568
6,367,812 B1 * 4/2002 Reinhardt .............. F16J 15/322
277/572
(Continued)

FOREIGN PATENT DOCUMENTS

CN  1853062 A  10/2006
EP  0033964 A2  8/1981
(Continued)

OTHER PUBLICATIONS

Search Report and translation for International Application No. PCT/JP2018/012199 dated May 29, 2018.
(Continued)

*Primary Examiner* — Nathan Cumar
(74) *Attorney, Agent, or Firm* — Pearne & Gordon LLP

(57) ABSTRACT

[Problem] To provide a sealing device having high pressure-resistance and durability for a reciprocating shaft.
[Solution] A sealing device comprising an oil seal member and a dust seal member. The oil seal member and the dust seal member each comprise a rigid ring provided inside a shaft hole and an elastic ring attached to the rigid ring, wherein the elastic ring has formed thereon a lip for slidably contacting a reciprocating shaft. The sealing device further comprises an intermediate rigid ring provided between the elastic ring of the oil seal member and the elastic ring of the dust seal member, in a direction parallel to the axial direction of the reciprocating shaft.

2 Claims, 7 Drawing Sheets

(58) Field of Classification Search
CPC ...... F16J 15/32; F16J 15/3204; F16J 15/3232; F16J 15/324
USPC ........................................................ 277/436
See application file for complete search history.

(56) References Cited

U.S. PATENT DOCUMENTS

| | | | |
|---|---|---|---|
| 7,665,740 B2* | 2/2010 | Munekata | F16F 9/362 |
| | | | 277/436 |
| 8,282,107 B2* | 10/2012 | Horiba | F16J 15/322 |
| | | | 277/551 |
| 2006/0103075 A1* | 5/2006 | Zahn | B62K 25/08 |
| | | | 277/436 |
| 2007/0052180 A1* | 3/2007 | Watanabe | F16J 15/322 |
| | | | 277/551 |
| 2008/0309016 A1* | 12/2008 | Ozawa | F16J 15/322 |
| | | | 277/345 |
| 2016/0153561 A1 | 6/2016 | Blechschmidt et al. | |

FOREIGN PATENT DOCUMENTS

| | | | |
|---|---|---|---|
| GB | 2115903 A | 9/1983 | |
| JP | S59-147937 U | 8/1984 | |
| JP | 2003-294154 A | 10/2003 | |
| JP | 4332703 B2 | 9/2009 | |

OTHER PUBLICATIONS

Extended European Search Report for European Application No. 18777982.2 dated Nov. 13, 2020.

\* cited by examiner

SEALING DEVICE

TECHNICAL FIELD

The present invention pertains to a sealing device to be used for sealing the area around a shaft of a device having a reciprocating shaft.

BACKGROUND ART

In instruments having reciprocating shafts such as hydraulic cylinder devices and shock absorbers, a sealing device for sealing an annular interval between a reciprocating shaft and a shaft hole inner surface is provided in a gap therebetween.

Patent document 1 discloses a sealing device for use in a shock absorber of a vehicle suspension device. This sealing device comprises a metal reinforcement ring, a main lip provided to the inner periphery of the reinforcement ring and facing an oil chamber side, and a dust lip provided to the inner periphery of the reinforcement ring and facing an outer space side. The main lip and the dust lip are formed from an elastic material such as fluororubber and are adhered to the reinforcement ring. More precisely, an elastic body part comprising the main lip and an elastic body part comprising the dust lip are adhered, respectively, to the two surfaces of the reinforcement ring. Further, a thin elastic body part for coupling these elastic body parts is adhered to the inner periphery surface of the reinforcement ring.

PRIOR ART DOCUMENTS

Patent Documents

Patent Document 1: Japanese Patent No. 4332703

SUMMARY OF INVENTION

Technical Problem

Accompanying the greater variation in vehicle driving environments and ways of being driven, the usage conditions of sealing devices for shock absorbers have become harsher. Further, when internal oil pressure is high such as in a monotube-type shock absorber, for example, designing requires consideration of the pressure resistance and the durability of the sealing device.

Here, the objective of the present invention is to provide a sealing device that has high pressure resistance and durability.

Solution to Problem

The sealing device according to the present invention is a sealing device provided between a reciprocating shaft and the inner surface of a shaft hole in which the reciprocating shaft is provided, wherein the sealing device comprises: an oil seal member comprising a liquid-side rigid ring made of a rigid body and provided inside the shaft hole, and a liquid-side elastic ring made of an elastic body and attached to the liquid-side rigid ring, the liquid-side elastic ring having formed thereon an oil lip which is provided radially inward of the liquid-side rigid ring and slidably makes sealing contact with the reciprocating shaft; a dust seal member comprising an atmosphere-side rigid ring made of a rigid body and provided inside the shaft hole, and an atmosphere-side elastic ring made of an elastic body and fixed to the atmosphere-side rigid ring, the atmosphere-side elastic ring having formed thereon a dust lip which is provided radially inward of the atmosphere-side rigid ring and slidably contacts the reciprocating shaft; and an intermediate rigid ring which is made of a rigid body, is attached to the inside of the shaft hole, and is provided between the liquid-side elastic ring and the atmosphere-side elastic ring in a direction parallel to the axial direction of the reciprocating shaft.

In this sealing device, the oil seal member and the dust seal member are separate members, the oil seal member and the dust seal member each comprise a rigid ring provided inside the shaft hole and an elastic ring attached to the rigid ring, and the elastic ring has formed thereon a lip for slidably contacting the reciprocating shaft. Between the liquid-side elastic ring of the oil seal member and the atmosphere-side elastic ring of the dust seal member, an intermediate rigid ring, which is different to the foregoing members, is provided in a direction parallel to the axial direction of the reciprocating shaft, and therefore, the liquid-side elastic ring and the atmosphere-side elastic can be reinforced by the intermediate rigid ring which is made of a rigid body. The liquid-side elastic ring which has an oil lip formed thereon is reinforced by the liquid-side rigid ring, and the atmosphere-side elastic ring which has a dust lip formed thereon is reinforced by the atmosphere-side rigid ring, and moreover, the liquid-side elastic ring and the atmosphere-side elastic ring are supported by a strong supporting force created by the intermediate rigid ring. Therefore, it is possible to enhance the pressure resistance and the durability of the sealing device.

When the sealing device is provided between the reciprocating shaft and the inner surface of the shaft hole, at least one of the liquid-side elastic ring and the atmosphere-side elastic ring always contacts the intermediate rigid ring. In this case, when the sealing device is being used, at least one of the liquid-side elastic ring and the atmosphere-side elastic ring is always reinforced by the intermediate rigid ring.

When the sealing device is provided between the reciprocating shaft and the inner surface of the shaft hole, both the liquid-side elastic ring and the atmosphere-side elastic ring always contact the intermediate rigid ring. In this case, when the sealing device is being used, both the liquid-side elastic ring and the atmosphere-side elastic ring are always reinforced by the intermediate rigid ring.

In a sealing device in one embodiment of the present invention, the intermediate rigid ring is fixed to the liquid-side rigid ring and the atmosphere-side rigid ring. In this case, the liquid-side rigid ring, the atmosphere-side rigid ring, and the intermediate rigid ring work as an integrated rigid body and can strongly reinforce the liquid-side elastic ring and the atmosphere-side elastic ring.

In the sealing device in one embodiment of the present invention: the liquid-side rigid ring comprises an annular portion and a cylindrical portion extending from an outer edge of the annular portion; the atmosphere-side rigid ring comprises an annular portion and a cylindrical portion extending from an outer edge of the cylindrical portion; and the intermediate rigid ring is sandwiched by the annular portion of the liquid-side rigid ring and the annular portion of the atmosphere-side rigid ring, and covered by the cylindrical portion of the liquid-side rigid ring and the cylindrical portion of the atmosphere-side rigid ring. In other words, the intermediate rigid ring is preferably incorporated inside a space surrounded by the annular portion of the liquid-side rigid ring, the cylindrical portion of the liquid-side rigid ring, the annular portion of the atmosphere-side rigid ring, and the cylindrical portion of the atmosphere-side rigid ring.

In this case, the intermediate rigid ring is strongly supported by the liquid-side rigid ring the atmosphere-side rigid ring which are provided inside the shaft hole. Further, when the sealing device is provided inside the shaft hole, mutual positioning of the oil seal member, the dust seal member, and the intermediate rigid ring is easy, and the oil seal member, the dust seal member, and the intermediate rigid ring can easily be incorporated.

In a sealing device in one embodiment of the present invention, the liquid-side elastic ring is fixed to one side surface of the liquid-side rigid ring and the inner peripheral surface of the liquid-side rigid ring, and the atmosphere-side elastic ring is fixed to one side surface of the atmosphere-side rigid ring and the inner peripheral surface of the atmosphere-side rigid ring. In this case, the contact area between the liquid-side elastic ring and the liquid-side rigid ring is large, and thus the liquid-side elastic ring is firmly fixed to the liquid-side rigid ring. Further, the contact area between the atmosphere-side elastic ring and the atmosphere-side rigid ring is large, and thus the atmosphere-side elastic ring is firmly fixed to the atmosphere-side rigid ring. Therefore, it is possible to further enhance the pressure resistance and the durability of the sealing device.

In a sealing device in one embodiment of the present invention, an elastic material is not fixed to the inner peripheral surface of the intermediate rigid ring. In this case, there is no risk of an elastic material peeling from the inner peripheral surface of the intermediate rigid ring, and thus the durability of the sealing device can be enhanced.

Advantageous Effects of Invention

In the present invention, the liquid-side elastic ring which has an oil lip formed thereon is reinforced by the liquid-side rigid ring, and the atmosphere-side elastic ring which has a dust lip formed thereon is reinforced by the atmosphere-side rigid ring, and moreover, the liquid-side elastic ring and the atmosphere-side elastic ring are supported by a strong supporting force created by the intermediate rigid ring. Therefore, it is possible to enhance the pressure resistance and the durability of the sealing device. Further, the oil seal member, the dust seal member, and the intermediate rigid ring are mutually separate members, and therefore, it is possible to exchange any of these members for a suitable member or select a suitable member according to the circumstances. For example, if the oil seal member has degraded due to age, it is possible to exchange only the oil seal member. Further, it is possible to prepare several kinds of oil seal members and several kinds of dust seal members having different sizes, shapes, structures, or other details, and to select a suitable oil seal member or dust seal member according to the environment in which the sealing device is used.

DESCRIPTION OF EMBODIMENTS

Below, various embodiments of the present invention are described with reference to the attached drawings.

Figure 1:
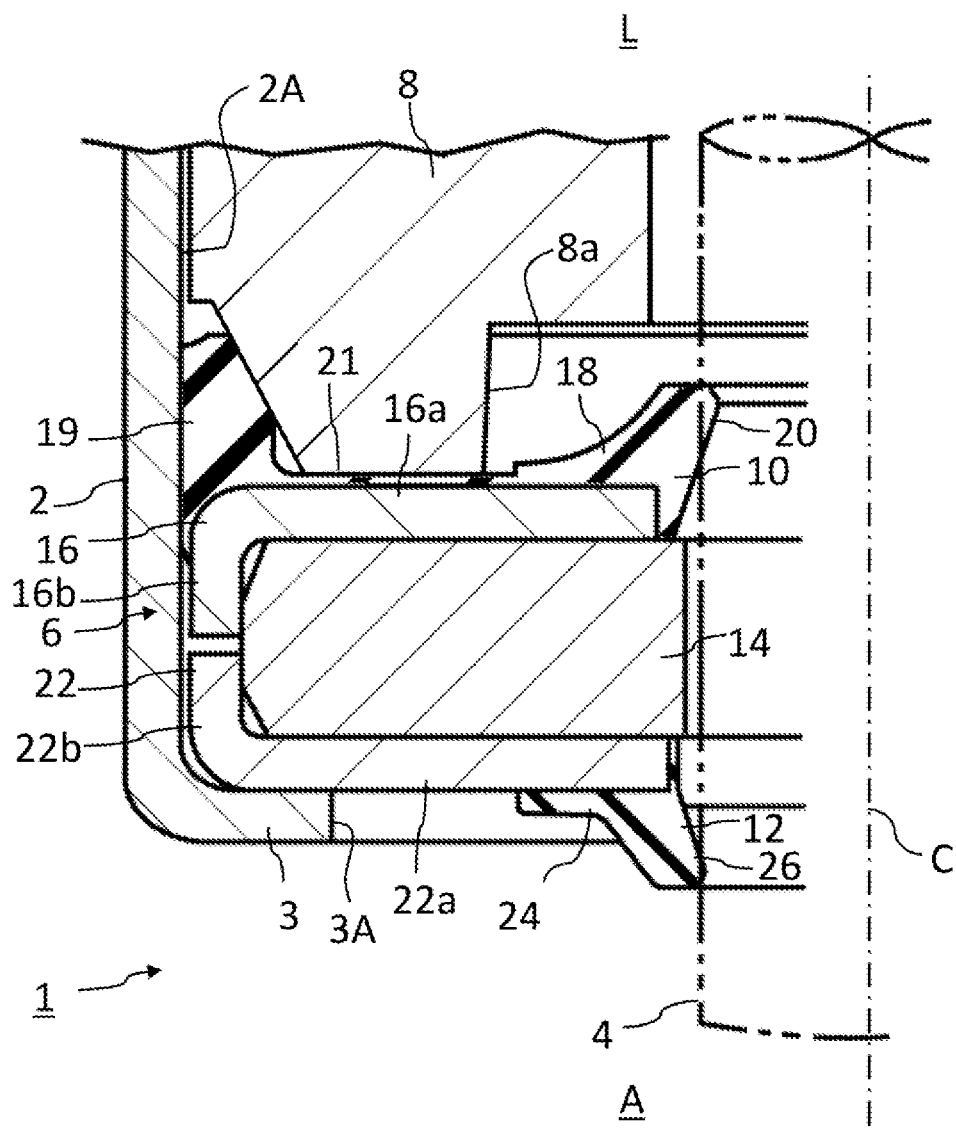
FIG. 1 is a cross-sectional view of a sealing device according to an embodiment of the present invention.

FIG. 1 is a diagram showing one embodiment of the present invention, and shows part of a shock absorber, which is an instrument that has a reciprocating shaft, and a sealing device provided in the shock absorber.

A shock absorber 1 comprises a cylindrical housing 2 and a cylindrical reciprocating shaft 4. The housing 2 is cylindrical and comprises a shaft hole 2A having the reciprocating shaft 4 provided therein. Oil, that is, a liquid L, has been put into the shaft hole 2A. An end wall 3 having an opening 3A formed in the center thereof is formed at the lower end of the housing 2.

A sealing device 6, which is an oil seal, and a rod guide 8 are provided inside the housing 2. Although the details are not shown in the diagram, the rod guide 8 is fixed to the housing 2. The rod guide 8 guides the reciprocating action of the reciprocating shaft 4 in the vertical direction of the diagram (that is, the axial direction of the reciprocating shaft 4) and presses the sealing device 6 to the end wall 3.

The sealing device 6 is provided inside the housing 2, and the movement of the sealing device 6 in the horizontal direction in the diagram is restricted by the inner peripheral surface of the housing 2. Further, the sealing device 6 is sandwiched by the rod guide 8 and the end wall 3, and the movement of the sealing device 6 along the axial direction of the reciprocating shaft 4 is restricted. The sealing device 6 is provided between the reciprocating shaft 4 and the inner surface of the shaft hole 2A in which the reciprocating shaft 4 is provided, and prevents or reduces leakage of the liquid L from a liquid L side to an atmosphere A side.

The reciprocating shaft 4 is cylindrical, the shaft hole 2A is cross-sectionally circular, and the sealing device 6 is substantially annular, but FIG. 1 shows only the left half of these parts. FIG. 1 discloses a central axis C which is common to the reciprocating shaft 4, the shaft hole 2A, and the sealing device 6.

In this embodiment, the sealing device 6 comprises three separate members, i.e., an oil seal member 10, a dust seal member 12, and a rigid ring (intermediate rigid ring) 14. If necessary, see FIG. 2 which is an exploded view clearly showing these three members.

The oil seal member 10 comprises: a liquid-side rigid ring 16 provided inside the shaft hole 2A and attached to the shaft hole 2A; and a liquid-side elastic ring 18 fixed to the liquid-side rigid ring 16. The liquid-side rigid ring 16 is formed from a rigid body such as a metal. The liquid-side rigid ring 16 has an L-shaped cross-section and comprises an annular portion 16a and a cylindrical portion 16b extending from an outer edge of the annular portion 16a.

The liquid-side elastic ring 18 is formed from an elastic material such as an elastomer and is fixed to the inner periphery of the annular portion 16a of the liquid-side rigid ring 16. The liquid-side elastic ring 18 has formed thereon an oil lip 20 provided radially inward of the liquid-side rigid ring 16. The oil lip 20 makes sealing contact with the outer peripheral surface of the reciprocating shaft 4 and prevents or reduces leakage of a liquid from the liquid L side to the atmosphere A side. When the reciprocating shaft 4 moves in the direction of the central axis C, the reciprocating shaft 4 slides with respect to the oil lip 20.

Moreover, the oil seal member 10 comprises an outer gasket 19. The outer gasket 19 is formed from an elastic material such as an elastomer and is fixed in close adherence with the annular portion 16a and the cylindrical portion 16b of the liquid-side rigid ring 16. The liquid-side rigid ring 16 applies a supporting force radially outward with respect to the outer gasket 19, that is, toward the inner peripheral surface of the shaft hole 2A, and the outer gasket 19 is compressed by the inner peripheral surface of the shaft hole 2A and the liquid-side rigid ring 16. Thus, the outer gasket 19 prevents or reduces leakage of a liquid through an outer portion of the shaft hole 2A from the liquid L side to the atmosphere A side.

Although the outer gasket 19 and the liquid-side elastic ring 18 may be separate, in this embodiment, they are coupled via a thin film portion 21. That is, the liquid-side elastic ring 18, the outer gasket 19, and the thin film portion 21 constitute a continuous integrated elastic portion formed from the same material. The thin film portion 21 is also fixed in close adherence with the liquid-side rigid ring 16. In this embodiment, a protrusion 8a of the guide rod 8 is contacted by the thin film portion 21 of the oil seal member 10 and a pressing force is applied to the sealing device 6 toward the end wall 3 of the housing 2.

The dust seal member 12 comprises: an atmosphere-side rigid ring 22 provided inside the shaft hole 2A and attached to the shaft hole 2A; and an atmosphere-side elastic ring 24 fixed to the atmosphere-side rigid ring 22. The atmosphere-side rigid ring 22 is formed from a rigid body such as a metal. The atmosphere-side rigid ring 22 has an L-shaped cross-section and comprises an annular portion 22a and a cylindrical portion 22b extending from an outer edge of the annular portion 22a.

The atmosphere-side elastic ring 24 is formed from an elastic material such as an elastomer and is fixed to the inner periphery of the annular portion 22a of the atmosphere-side rigid ring 22. The atmosphere-side elastic ring 24 has formed thereon a dust lip 26 provided radially inward of the atmosphere-side rigid ring 22. The dust lip 26 contacts the outer peripheral surface of the reciprocating shaft 4 and predominantly fulfills a role of preventing foreign matter (for example, mud, water, dust) from entering from the atmosphere A side to the liquid L side. When the reciprocating shaft 4 moves in the direction of the central axis C, the reciprocating shaft 4 slides with respect to the dust lip 26. The dust lip 26 may make sealing contact with the outer peripheral surface of the reciprocating shaft 4 so as to fulfill a role of preventing or reducing leakage of a liquid.

In order to contact the outer peripheral surface of the reciprocating shaft 4, the oil lip 20 and the dust lip 26 are caused to elastically deform radially outwardly more than the state shown in FIG. 1. FIG. 1 shows a state in which a sealing device 1 is not provided around the reciprocating shaft 4 (the reciprocating shaft 4 is shown by a dotted line) and does not show deformation of these lips 20, 26.

The rigid ring 14 (intermediate rigid ring 14) is formed from a rigid body such as a metal. The rigid ring 14 is provided inside the shaft hole 2A and attached to the shaft hole 2A. In this embodiment, the intermediate rigid ring 14 is a circular plate shape and has formed in the center thereof a through hole into which the reciprocating shaft 4 is inserted. The thickness of the intermediate rigid ring 14 is greater than the thickness of each of the liquid-side rigid ring 16 and the atmosphere-side rigid ring 22, and is preferably at least two times greater than the thickness of each of the liquid-side rigid ring 16 and the atmosphere-side rigid ring 22.

With respect to the oil seal member 10, the dust seal member 12, and the intermediate rigid ring 14 being "attached to the shaft hole 2A", the meaning is being attached directly or indirectly to the shaft hole 2A. These may be attached to the shaft hole 2A directly (for example, by press-fitting), and may also be attached to the shaft hole 2A indirectly (for example, as in this embodiment, by being pressed to the end wall 3 by the guide rod 8).

In this embodiment, the inner diameter of the intermediate rigid ring 14 is smaller than the inner diameter of a region in the liquid-side elastic ring 18 of the oil seal member 10 that contacts the intermediate rigid ring 14, and also smaller than the inner diameter of a region in the atmosphere-side elastic ring 24 of the dust seal member 12 that contacts the intermediate rigid ring 14. Accordingly, the rigid ring 14 is provided between the liquid-side elastic ring 18 and the atmosphere-side elastic ring 24 in a direction parallel to the axial direction of the reciprocating shaft 4.

The intermediate rigid ring 14 is fixed to the liquid-side rigid ring 16 and the atmosphere-side rigid ring 22. More specifically, the intermediate rigid ring 14 is sandwiched by the annular portion 16a of the liquid-side rigid ring 16 and the annular portion 22a of the atmosphere-side rigid ring 22, and is covered by the cylindrical portion 16b of the liquid-side rigid ring 16 and the cylindrical portion 22b of the atmosphere-side rigid ring 22.

In this embodiment, between the liquid-side elastic ring 18 of the oil seal member 10 and the atmosphere-side elastic ring 24 of the dust seal member 12, the intermediate rigid ring 14, which is separate from the liquid-side elastic ring 18 and the atmosphere-side elastic ring 24, is provided in a direction parallel to the axial direction of the reciprocating shaft 4, and therefore, the liquid-side elastic ring 18 and the atmosphere-side elastic ring 24 are reinforced by the intermediate rigid ring 14 which is made of a rigid body. The liquid-side elastic ring 18 which has an oil lip 20 formed thereon is reinforced by the liquid-side rigid ring 16, and the atmosphere-side elastic ring 24 which has a dust lip 26 formed thereon is reinforced by the atmosphere-side rigid ring 22, and moreover, the liquid-side elastic ring 18 and the atmosphere-side elastic ring 24 are supported by a strong supporting force created by the intermediate rigid ring 14. Therefore, it is possible to enhance the pressure resistance and the durability of the sealing device 6, and in particular, those of the lips 20, 26.

Preferably, when the sealing device 6 is provided between the reciprocating shaft 4 and the inner surface of the shaft hole 2A, at least one of the liquid-side elastic ring 18 and the atmosphere-side elastic ring 24 always contacts the intermediate rigid ring 14. In this case, when the sealing device 6 is being used, at least one of the liquid-side elastic ring 18 and the atmosphere-side elastic ring 24 is always reinforced by the intermediate rigid ring 14.

Preferably, when the sealing device 6 is provided between the reciprocating shaft 4 and the inner surface of the shaft hole 2A, both the liquid-side elastic ring 18 and the atmosphere-side elastic ring 24 always contact the intermediate rigid ring 14. In this case, when the sealing device 6 is being used, both the liquid-side elastic ring 18 and the atmosphere-side elastic ring 24 are always reinforced by the intermediate rigid ring 14.

The intermediate rigid ring 14 is fixed to the liquid-side rigid ring 16 and the atmosphere-side rigid ring 22. Due thereto, the liquid-side rigid ring 16, the atmosphere-side rigid ring 22, and the intermediate rigid ring 14 work as an integrated rigid body and can strongly reinforce the liquid-side elastic ring 18 and the atmosphere-side elastic ring 24.

The intermediate rigid ring 14 is sandwiched by the annular portion 16a of the liquid-side rigid ring 16 and the annular portion 22a of the atmosphere-side rigid ring 22, and is covered by the cylindrical portion 16b of the liquid-side rigid ring 16 and the cylindrical portion 22b of the atmosphere-side rigid ring 22. In other words, the intermediate rigid ring 14 is incorporated inside a space surrounded by the annular portion 16a of the liquid-side rigid ring 16, the cylindrical portion 16b of the liquid-side rigid ring 16, the annular portion 22a of the atmosphere-side rigid ring 22, and the cylindrical portion 22b of the atmosphere-side rigid ring 22. Accordingly, the intermediate rigid ring 14 is strongly supported by the liquid-side rigid ring 16 and the atmosphere-side rigid ring 22 which are provided inside the shaft hole 2A. Further, when the sealing device is provided inside the shaft hole 2A, mutual positioning of the oil seal member 10, the dust seal member 12 and the intermediate rigid ring 14 is easy, and the oil seal member 10, the dust seal member 12, and the intermediate rigid ring 14 can easily be incorporated.

In this embodiment, it is preferable that the liquid-side elastic ring 18 is fixed in close adherence with one side surface of the liquid-side rigid ring 16 and the inner peripheral surface of the liquid-side rigid ring 16, and the atmosphere-side elastic ring 24 is fixed in close adherence with one side surface of the atmosphere-side rigid ring 22 and the inner peripheral surface of the atmosphere-side rigid ring 22. In this case, the contact area between the liquid-side elastic ring 18 and the liquid-side rigid ring 16 is large, and thus the liquid-side elastic ring 18 is firmly fixed to the liquid-side rigid ring. Further, the contact area between the atmosphere-side elastic ring 24 and the atmosphere-side rigid ring 22 is large, and thus the atmosphere-side elastic ring 24 is firmly fixed to the atmosphere-side rigid ring 22. Therefore, it is possible to further enhance the pressure resistance and the durability of the sealing device 6.

Moreover, in this embodiment, between the liquid-side elastic ring 18 of the oil seal member 10 and the atmosphere-side elastic ring 24 of the dust seal member 12, the intermediate rigid ring 14, which is separate from the liquid-side elastic ring 18 and the atmosphere-side elastic ring 24, is provided in a direction parallel to the axial direction of the reciprocating shaft 4, and therefore, it is possible to reduce the size of a gap between the outer peripheral surface of the reciprocating shaft 4 and the inner peripheral surface of the intermediate rigid ring 14. Since this gap is small, there is little risk that, with the reciprocal movement of the reciprocating shaft 4, the oil lip 20 and the dust lip 26 enter this gap, and thus it is possible to further enhance the pressure resistance and the durability of the sealing device 6.

Although an elastic material such as an elastomer may be fixed to the inner peripheral surface of the intermediate rigid ring 14, such an elastic material is unnecessary and is not provided in this embodiment. Due thereto, there is no risk of an elastic material peeling from the inner peripheral surface of the intermediate rigid ring 14, and thus it is possible to enhance the durability of the sealing device.

To produce the oil seal member 10, an elastic member comprising the liquid-side elastic member 18, the outer gasket 19, and the thin film portion 21 may, for example, be adhered to the liquid-side rigid ring 16 using an adhesive. To produce the dust seal member 12, the atmosphere-side elastic member 24 may, for example, be adhered to the atmosphere-side rigid ring 22 using an adhesive.

Figure 3:
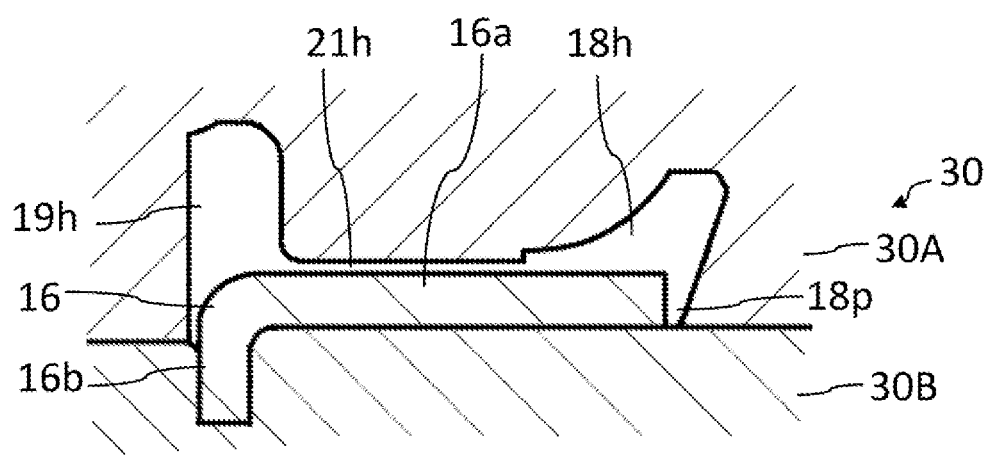
FIG. 3 is a schematic view showing an example of a process for producing an oil seal member of the sealing device of FIG. 1.
Figure 4:
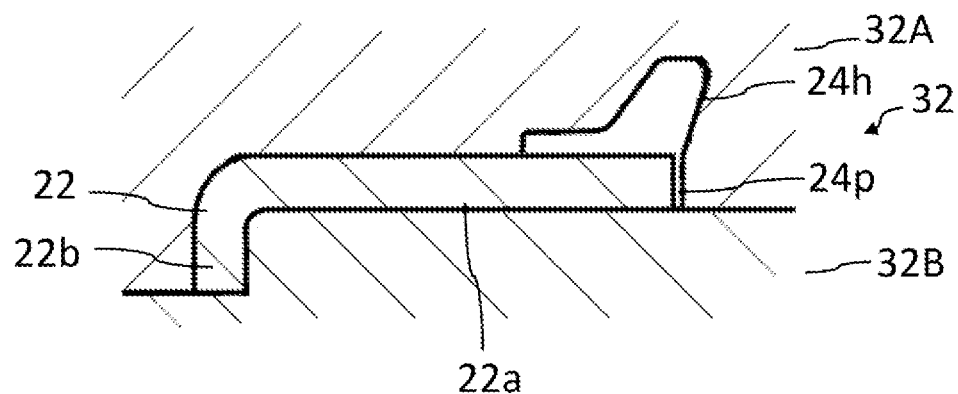
FIG. 4 is a schematic view showing an example of a process for producing a dust seal member of the sealing device of FIG. 1.

Other steps of a production method for the oil seal member 10 and the dust seal member 12 are explained with reference to FIG. 3 and FIG. 4. For example, it is possible to mold the oil seal member 10 and the dust seal member 12 by using, respectively, molds 30 and 32. The mold 30 comprises an upper mold 30A and a lower mold 30B, and the mold 32 comprises an upper mold 32A and a lower mold 32B.

In this production method, the locations of the liquid-side rigid ring 16 to which the liquid-side elastic ring 18, the outer gasket 19, and the thin film portion 21 are to be bonded are coated with an adhesive, the location of the atmosphere-side rigid ring 22 to which the atmosphere-side elastic ring 24 is to be bonded is coated with the adhesive, and then the liquid-side rigid ring 16 and the atmosphere-side rigid ring 22 are arranged, respectively, in the molds 30, 32. In addition, an elastic material is arranged in the molds 30, 32, the molds 30, 32 are compressed, and the liquid-side elastic ring 18, the outer gasket 19, the thin film portion 21, and the atmosphere-side elastic ring 24 are molded, thereby completing the oil seal member 10 and the dust seal member 12. FIG. 3 shows a molding space 18h for molding the liquid-side elastic ring 18, a molding space 19h for molding the outer gasket 19, and a molding space 21h for molding the thin film portion 21. FIG. 4 shows a molding space 24h for molding the atmosphere-side elastic ring 24.

In this production method, there is a concern that the elastic material will not be sufficiently incorporated in a portion 18p of the molding space 18h and a portion 24p of the molding space 24h. In this case, it is possible for the length of a region 18q (region contacting the inner peripheral surface of the annular portion 16a of the liquid-side rigid ring 16) of the liquid-side elastic ring 18 and the length of a region 24q (region contacting the inner peripheral surface of the annular portion 22a of the atmosphere-side rigid ring 22), of the atmosphere-side elastic ring 24 shown in FIG. 2, to be slightly shorter than the lengths shown in the drawing. Further, it is also possible to produce the oil seal member 10 and the dust seal member 12 by injection-molding an elastic material using a mold, but in that case, the lengths of the region 18q and the region 24q may be slightly shorter than the lengths shown in the drawing.

However, if the length of the inner peripheral surface of the annular portion 16a of the liquid-side rigid ring 16 in a direction parallel to the central axis C, and the length of inner peripheral surface of the annular portion 22a of the atmosphere-side rigid ring 22 in a direction parallel to the central axis C, are designed to be sufficiently large, and the length of the region 18q and the length of the region 24q are designed to be sufficiently large, it is possible to achieve an adhesive force between the region 18q and the liquid-side rigid ring 16, and between the region 24q and the atmosphere-side rigid ring 22.

Further, even supposing the lengths of the region 18q and the region 24q were insufficient, due to elastic deformation of the liquid-side elastic ring 18 and the atmosphere-side elastic ring 24 in a direction parallel to the central axis C, the region 18q and the region 24q would be able to contact the intermediate rigid ring 14. Accordingly, the liquid-side elastic ring 18 and the atmosphere-side elastic ring 24 would be reinforced by the intermediate rigid ring 14.

Figure 2:
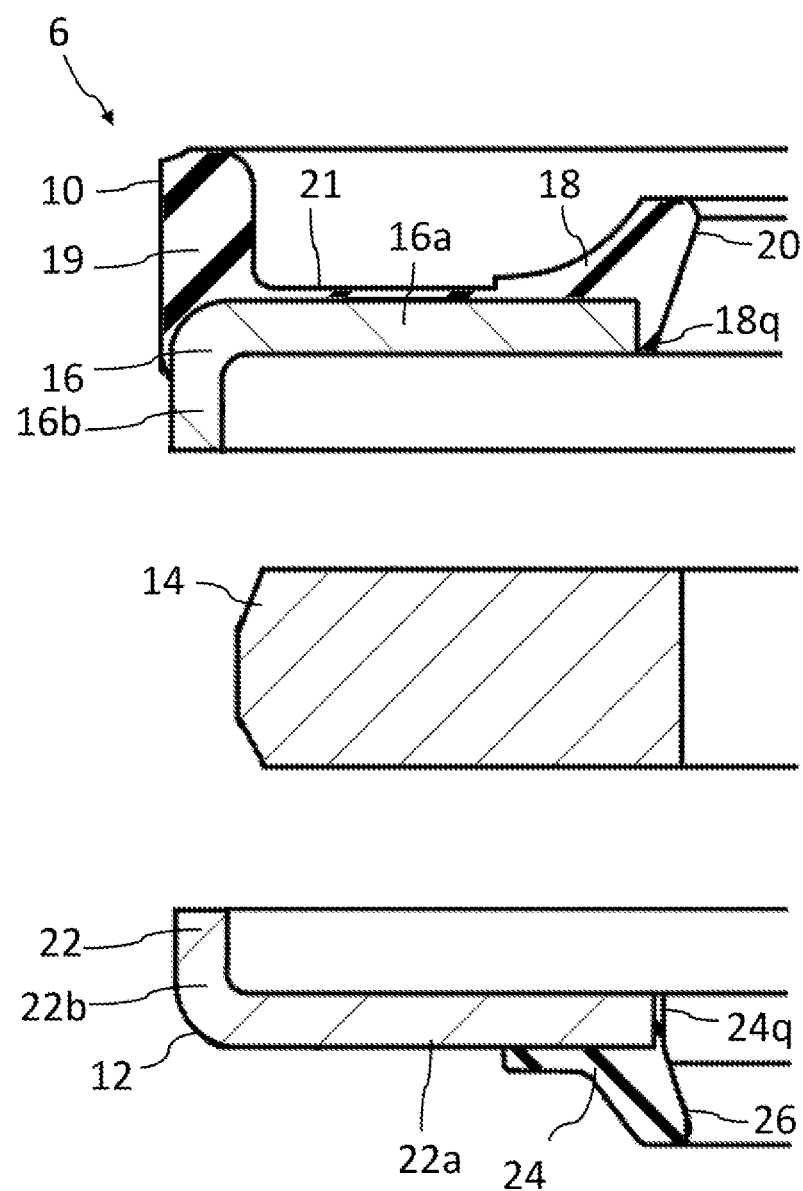
FIG. 2 is an exploded cross-sectional view of the sealing device of FIG. 1.

On the other hand, the lengths of the region 18q and the region 24q may be slightly greater than the lengths shown in FIG. 2. The same also applies when producing the oil seal member 10 and the dust seal member 12 by injection-molding an elastic material. However, in such a case, the structure shown in FIG. 1 is realized by compressing the excess portions of the region 18q and the region 24q using the intermediate rigid ring 14 provided between the liquid-side elastic ring 18 and the atmosphere-side elastic ring 24. Accordingly, the liquid-side elastic ring 18 and the atmosphere-side elastic ring 24 would be reinforced by the intermediate rigid ring 14.

As described above, even if the lengths of the region 18q and the region 24q are greater or smaller than the desired lengths, the liquid-side elastic ring 18 and the atmosphere-side elastic ring 24 can be supported by the liquid-side rigid ring 16, the atmosphere-side rigid ring 22, and the intermediate rigid ring 14. Accordingly, it is possible to enhance the pressure resistance and the durability of the sealing device 6.

Figure 5:
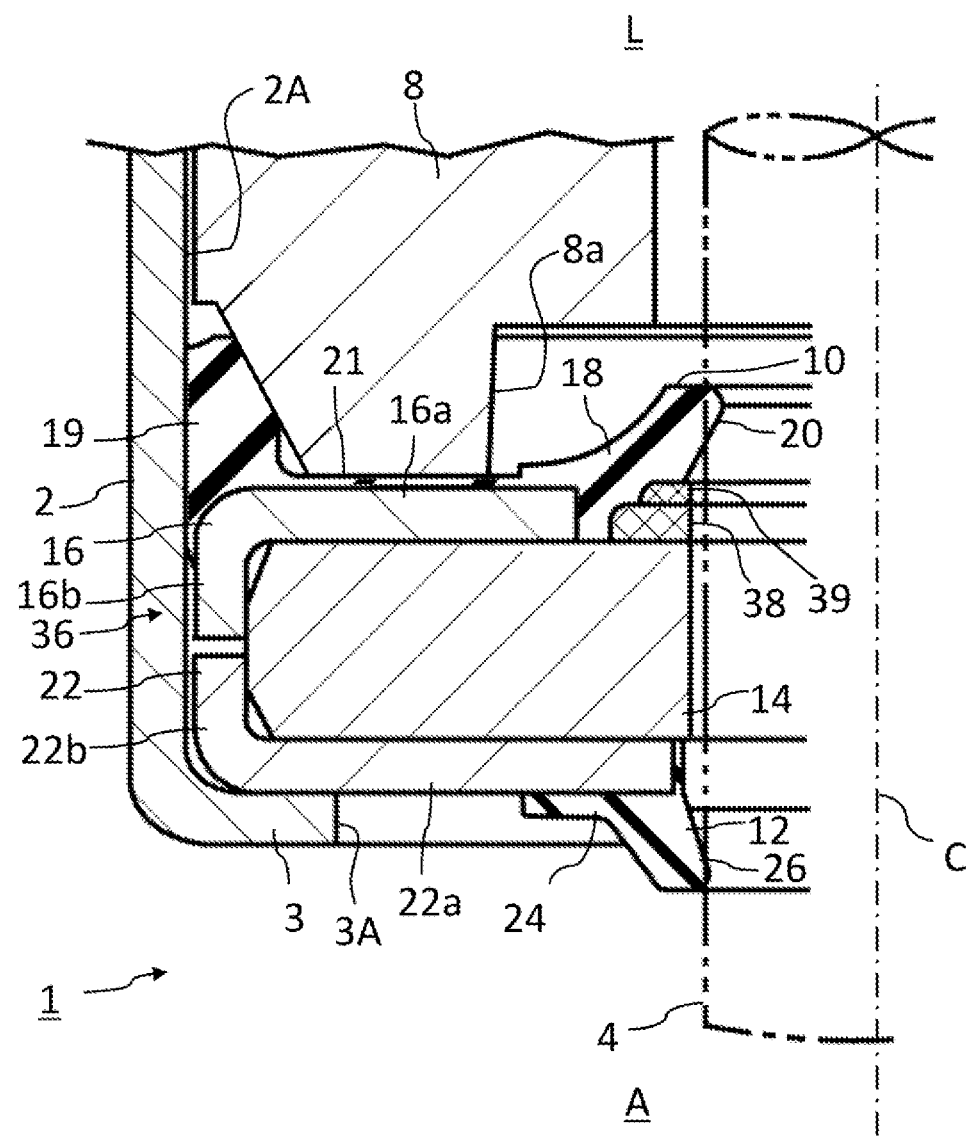
FIG. 5 is a cross-sectional view of a sealing device according to another embodiment.

FIG. 5 is a cross-sectional view of a sealing device 36 according to another embodiment. Diagrams from FIG. 5 onwards show constituent elements which are in common with the abovementioned embodiment, and therefore the same reference signs are used and no detailed description is provided regarding these constituent elements. This sealing device 36 comprises back-up rings 38, 39 for reinforcing the oil lip 20.

The back-up rings 38, 39 are formed from a rigid body such as a resin or a metal. The back-up rings 38, 39 are detachably incorporated in the inner peripheral surface of the liquid-side elastic ring 18 of the oil seal member 10 in a region near the intermediate rigid ring 14. A groove for incorporating the back-up rings 38, 39 may be formed in the inner peripheral surface of the liquid-side elastic ring 18 in a region near the intermediate rigid ring 14. Due to the back-up rings 38, 39, it is possible to enhance the pressure resistance and the durability of the sealing device 36, and in particular of the oil lip 20.

Although two back-up rings 38, 39 are used in this embodiment, it is also possible to use only one of the back-up rings 38, 39. Or, it is also possible to use a single back-up ring of a shape in which the two back-up rings 38, 39 of this embodiment are combined.

Figure 6:
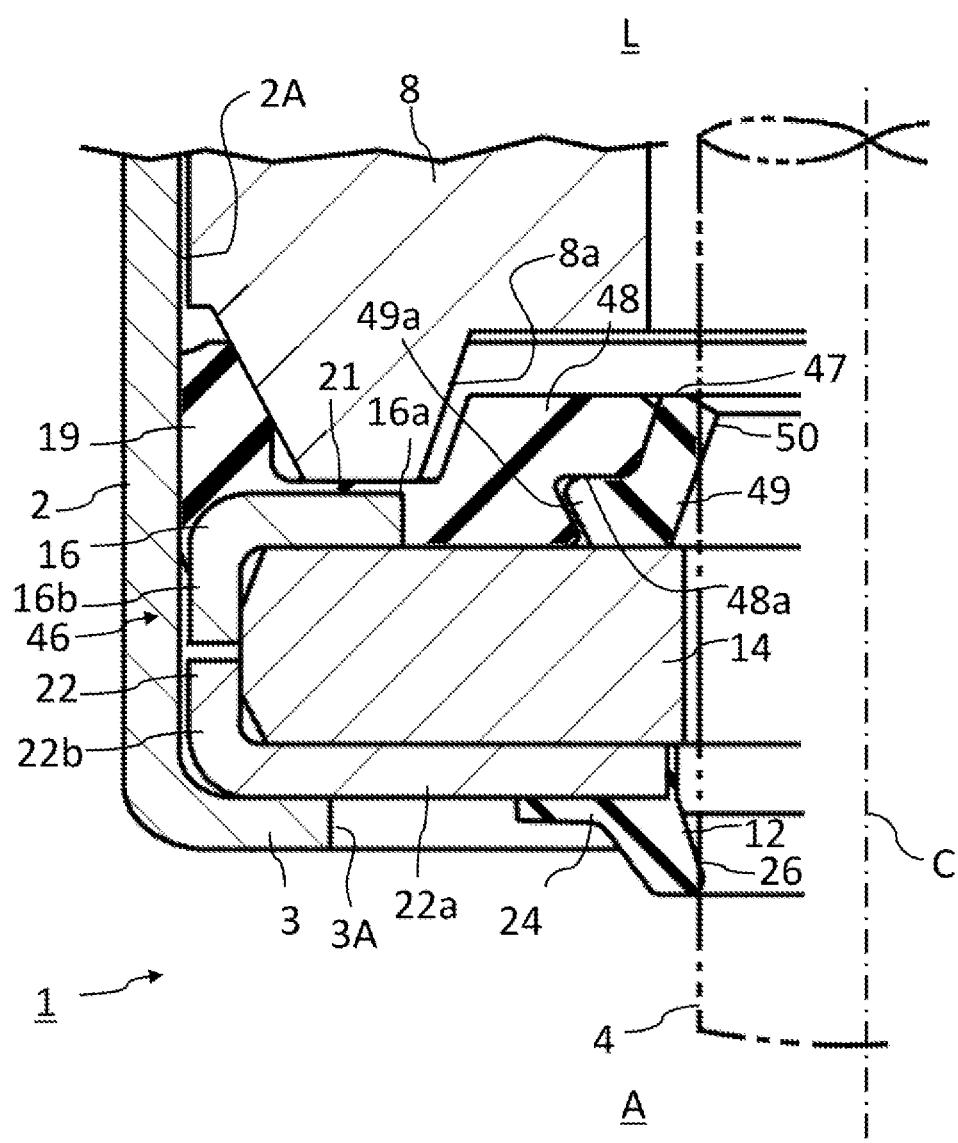
FIG. 6 is a cross-sectional view of a sealing device according to another embodiment.

FIG. 6 is a cross-sectional view of a sealing device 46 according to another embodiment. This sealing device 46 comprises, instead of the liquid-side elastic ring 18 of the abovementioned embodiment, a liquid-side elastic ring 49 which is indirectly attached to the liquid-side rigid ring 16. An oil seal member 47 of the sealing device 46 comprises: a liquid-side rigid ring 16; an outer gasket 19 fixed in close adherence with the liquid-side rigid ring 16; an intermediate elastic ring 48 fixed in close adherence with the liquid-side rigid ring 16; a thin film portion 21 which couples the outer gasket 19 and the intermediate elastic ring 48; and a liquid-side elastic ring 49. The thin film portion 21 is also fixed in close adherence with the liquid-side rigid ring 16.

Although the outer gasket 19 and the intermediate elastic ring 48 may be separate, in this embodiment, they are coupled via the thin film portion 21. That is, the intermediate elastic ring 48, the outer gasket 19, and the thin film portion 21 constitute a continuous integrated elastic portion formed from the same elastic material (for example, an elastomer). In this embodiment, the annular portion 16a of the liquid-side rigid ring 16 may be smaller than that of other above-mentioned embodiments. The intermediate elastic ring 48 is fixed in close adherence with the inner peripheral surface of the annular portion 16a.

Although the liquid-side elastic ring 49 is formed from an elastic material (for example, an elastomer), it is a separate member from the abovementioned elastic portion and is detachably attached to the intermediate elastic ring 48. A V-shaped groove 48a is formed on the inner peripheral surface of the intermediate elastic ring 48, and a protrusion 49a of the liquid-side elastic ring 49 is incorporated in this groove 48a.

The liquid-side elastic ring 49 has formed thereon an oil lip 50 provided radially inward of the liquid-side rigid ring 16. The oil lip 50 makes sealing contact with the outer peripheral surface of the reciprocating shaft 4 and prevents or reduces leakage of a liquid from the liquid L side to the atmosphere A side. When the reciprocating shaft 4 moves in the direction of the central axis C, the reciprocating shaft 4 slides with respect to the oil lip 50.

Figure 7:
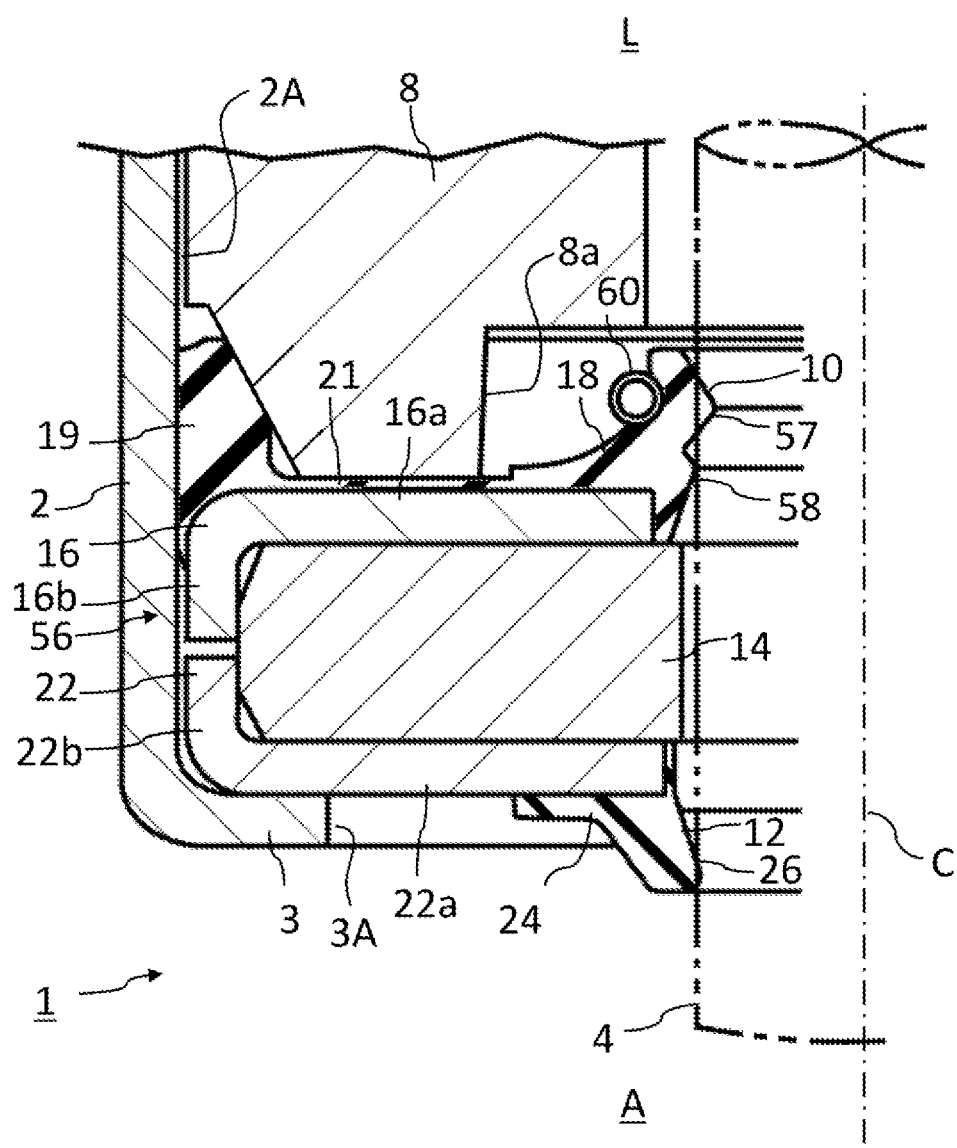
FIG. 7 is a cross-sectional view of a sealing device according to another embodiment.

FIG. 7 is a cross-sectional view of a sealing device 56 according to another embodiment. The liquid-side elastic ring 18 of the oil seal member 10 of this sealing device 56 comprises a main oil lip 57 and a secondary oil lip 58. The main oil lip 57 and the secondary oil lip 58 both fulfill a role of sealing a liquid. The main oil lip 57 has the smallest inner diameter of the lips 26, 57, 58 and when the reciprocating shaft 4 moves in the direction of the central axis C, the reciprocating shaft 4 slides with respect to the main oil lip 57. The secondary oil lip 58 reinforces the main oil lip 57, and when the reciprocating shaft 4 is eccentric with respect to the shaft hole 2A, the secondary oil lip 58 supplements the liquid sealing function of the main oil lip 57.

Further, this sealing device 56 comprises a garter spring 60 wound around the liquid-side elastic ring 18. The garter spring 18 applies a force on the lips 57, 58 for pressing the main oil lip 57 and the secondary oil lip 58 to the reciprocating shaft 4.

As is clear from FIG. 1, FIG. 5, FIG. 6, and FIG. 7, the different abovementioned embodiments have the dust seal member 12 and the intermediate rigid ring 14 in common, while the details of the oil seal member differ. It is possible to prepare several kinds of oil seal members having different sizes, shapes, structures, or other details, and to select a suitable oil seal member according to the usage environment of the sealing device. That is, in the present invention, the oil seal member, the dust seal member, and the intermediate rigid ring are mutually separate members, and therefore, it is possible to customize the sealing device according to the circumstances. It is possible to prepare several kinds of dust seal members having different sizes, shapes, structures, or other details, and to select a suitable dust seal member according to the usage environment of the sealing device. Further, if the oil seal member or dust seal member has degraded due to age, it is possible to exchange only the degraded member.

Various embodiments of the present invention have been described above, but the above descriptions do not limit the present invention and, in the technical scope of the present invention, various modified examples can be considered, including deletion, addition, and exchange of constituent elements.

For example, the present invention is not limited to a shock absorber and may also be applied in a sealing device used in another instrument having a reciprocating shaft such as a hydraulic cylinder device.

Figure 8:
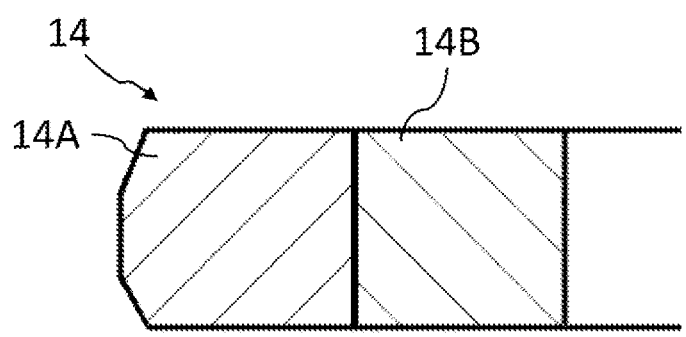
FIG. 8 is a cross-sectional view showing deformation of an intermediate rigid ring of the sealing device of FIG. 1.

In the abovementioned embodiments, the intermediate rigid ring 14 is a single part, but as shown in FIG. 8 and FIG.

Figure 9:
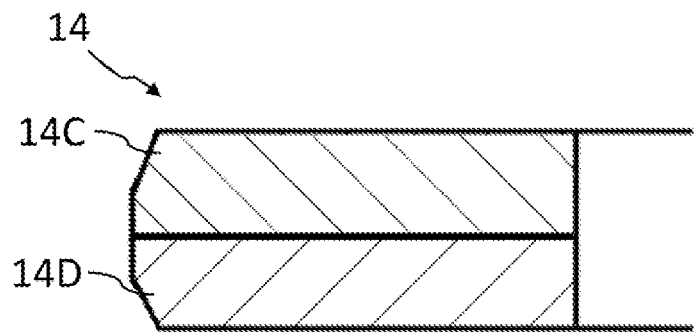
FIG. 9 is a cross-sectional view showing a deformation of an intermediate rigid ring of the sealing device of FIG. 1.

9, it may also be configured from a plurality of parts. The intermediate rigid ring 14 shown in FIG. 8 comprises an outer ring 14A and an inner ring 14B incorporated in the inner side of the outer ring 14A. The intermediate rigid ring 14 shown in FIG. 9 comprises two rings 14C, 14D having the same outer diameter and inner diameter. The number of parts of the intermediate rigid ring 14 may be three or more.

REFERENCE SIGNS LIST

1 Shock absorber
2 Housing
2A Shaft hole
3 End wall
3A Opening
4 Reciprocating shaft
6, 36, 46, 56 Sealing device
8 Rod guide
10, 47 Oil seal member
12 Dust seal member
14 Rigid ring (intermediate rigid ring)
14A Outer ring
14B Inner ring
14C, 14D Ring
16 Liquid-side rigid ring
16a Annular portion
16b Cylindrical portion
18 Liquid-side elastic ring
18h, 19h, 21h, 24h Molding space
19 Outer gasket
20 Oil lip
21 Thin film portion
22 Atmosphere-side rigid ring
22a Annular portion
22b Cylindrical portion
24 Atmosphere-side elastic ring
26 Dust lip
30 Mold, mold
30A, 32A Upper mold
30B, 32B Lower mold
38, 39 Back-up ring
48 Intermediate elastic ring
48a Groove
49 Liquid-side elastic ring
49a Protrusion
50 Oil lip
57 Main oil lip
58 Secondary oil lip
60 Garter spring

The invention claimed is:

1. A sealing device to be provided between a reciprocating shaft and an inner surface of a shaft hole in which the reciprocating shaft is provided, wherein the sealing device is characterized by comprising:
    an oil seal member comprising a liquid-side rigid ring made of a rigid body and provided inside the shaft hole, and a liquid-side elastic ring made of an elastic body and attached to the liquid-side rigid ring, the liquid-side elastic ring having formed thereon an oil lip which is provided radially inward of the liquid-side rigid ring and slidably makes sealing contact with the reciprocating shaft;
    a dust seal member comprising an atmosphere-side rigid ring made of a rigid body and provided inside the shaft hole, and an atmosphere-side elastic ring made of an elastic body and fixed to the atmosphere-side rigid, the atmosphere-side elastic ring having formed thereon a dust lip which is provided radially inward of the atmosphere-side rigid ring and slidably contacts the reciprocating shaft; and
    an intermediate rigid ring which is made of a rigid body, is attached to the inside of the shaft hole, and is provided between the liquid-side elastic ring and the atmosphere-side elastic ring in a direction parallel to the axial direction of the reciprocating shaft,
    the sealing device characterized in that:
    the liquid-side rigid ring comprises an annular portion and a cylindrical portion extending from an outer edge of the annular portion;
    the atmosphere-side rigid ring comprises an annular portion and a cylindrical portion extending from an outer edge of the annular portion; and
    the intermediate rigid ring is sandwiched by the annular portion of the liquid-side rigid ring and the annular portion of the atmosphere-side rigid ring, and is covered by the cylindrical portion of the liquid-side rigid ring and the cylindrical portion of the atmosphere-side rigid ring.

2. A sealing device to be provided between a reciprocating shaft and an inner surface of a shaft hole in which the reciprocating shaft is provided, wherein the sealing device is characterized by comprising:
    an oil seal member comprising a liquid-side rigid ring made of a rigid body and provided inside the shaft hole, and a liquid-side elastic ring made of an elastic body and attached to the liquid-side rigid ring, the liquid-side elastic ring having formed thereon an oil lip which is provided radially inward of the liquid-side rigid ring and slidably makes sealing contact with the reciprocating shaft;
    a dust seal member comprising an atmosphere-side rigid ring made of a rigid body and provided inside the shaft hole, and an atmosphere-side elastic ring made of an elastic body and fixed to the atmosphere-side rigid, the atmosphere-side elastic ring having formed thereon a dust lip which is provided radially inward of the atmosphere-side rigid ring and slidably contacts the reciprocating shaft; and
    an intermediate rigid ring which is made of a rigid body, is attached to the inside of the shaft hole, and is provided between the liquid-side elastic ring and the atmosphere-side elastic ring in a direction parallel to the axial direction of the reciprocating shaft,
    the sealing device characterized in that an elastic material is not fixed to an inner peripheral surface of the intermediate rigid ring.

* * * * *